US011151808B2

(12) United States Patent
Jiang et al.

(10) Patent No.: US 11,151,808 B2
(45) Date of Patent: Oct. 19, 2021

(54) VEHICLE FAULT ROOT CAUSE DIAGNOSIS

(71) Applicant: GM Global Technology Operations LLC, Detroit, MI (US)

(72) Inventors: Shengbing Jiang, Rochester Hills, MI (US); Chaitanya Sankavaram, Rochester Hills, MI (US); David A. Frank, Rochester Hills, MI (US); Brian L. Buck, Highland, MI (US); Janelle Kane Rolando, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 16/212,120

(22) Filed: Dec. 6, 2018

(65) Prior Publication Data

US 2020/0184742 A1 Jun. 11, 2020

(51) Int. Cl.
*G07C 5/08* (2006.01)
*G06N 7/00* (2006.01)
*G06N 20/00* (2019.01)
*G07C 5/00* (2006.01)

(52) U.S. Cl.
CPC ............ *G07C 5/0808* (2013.01); *G06N 7/005* (2013.01); *G06N 20/00* (2019.01); *G07C 5/008* (2013.01)

(58) Field of Classification Search
CPC .......... G06N 20/00; G06N 7/005; G06N 7/00; G07C 5/008; G07C 5/0808; G07C 5/08; B60W 50/00; B60W 50/02; B60W 50/0205; B60W 50/021; B60W 50/0225; B60W 50/032; B60W 50/04
See application file for complete search history.

(56) References Cited

U.S. PATENT DOCUMENTS

| 6,105,149 | A  | * | 8/2000  | Bonissone | G16H 30/20 714/26   |
|-----------|----|---|---------|-----------|---------------------|
| 6,609,217 | B1 | * | 8/2003  | Bonissone | G16H 30/20 714/26   |
| 8,594,977 | B2 | * | 11/2013 | Laberge   | G05B 23/0278 702/184|
| 8,620,714 | B2 | * | 12/2013 | Williams  | G06Q 10/08 705/7.22 |
| 8,676,432 | B2 | * | 3/2014  | Patnaik   | G06F 16/2474 701/29.1|

(Continued)

*Primary Examiner* — Angelina Shudy
(74) *Attorney, Agent, or Firm* — Quinn IP Law

(57) ABSTRACT

A method of root cause diagnosis of fault data from a vehicle includes identifying a first vehicle fault and selecting from field repair data a vehicle feature corresponding to the identified first vehicle fault. The method also includes identifying from the field repair data an effective repair of the identified first vehicle fault. The method additionally includes training and testing via a machine learning algorithm, a labor code classifier using the identified effective repair of the first vehicle fault and the selected vehicle feature corresponding to the identified first vehicle fault. The method also includes identifying and classifying, using the trained classifier, indistinguishable labor codes. Furthermore, the method includes communicating the identified and classified indistinguishable labor codes for diagnosing a root cause of real time first vehicle fault data. A computer-readable medium storing an executable computer algorithm for performing the root cause diagnosis of vehicle fault data is also envisioned.

20 Claims, 5 Drawing Sheets

(56) References Cited

U.S. PATENT DOCUMENTS

| | | | | |
|---|---|---|---|---|
| 8,732,112 B2* | 5/2014 | Singh | ................ | G05B 23/0275 706/51 |
| 8,868,282 B2* | 10/2014 | Giles | ................ | B60W 50/035 701/29.2 |
| 8,886,574 B2* | 11/2014 | Yuan | ................ | G06N 20/00 706/12 |
| 8,924,071 B2* | 12/2014 | Stanek | ................ | G06Q 10/10 701/31.4 |
| 8,996,235 B2* | 3/2015 | Singh | ................ | G05B 23/0278 701/29.4 |
| 9,087,421 B2* | 7/2015 | Tsuchikiri | ................ | G01M 17/00 |
| 9,165,413 B2* | 10/2015 | Jones | ................ | G07C 5/0808 |
| 9,514,580 B2* | 12/2016 | Collins | ................ | G07C 5/085 |
| 9,524,592 B2* | 12/2016 | Jones | ................ | G07C 5/008 |
| 9,672,097 B2* | 6/2017 | Matthews | ................ | G06F 11/0751 |
| 10,354,462 B1* | 7/2019 | Zhang | ................ | G07C 5/0808 |
| 10,650,616 B2* | 5/2020 | Zhang | ................ | G07C 5/008 |
| 2010/0030418 A1* | 2/2010 | Holland | ................ | G06F 11/008 701/31.4 |
| 2010/0063668 A1* | 3/2010 | Zhang | ................ | G06Q 10/04 701/29.5 |
| 2011/0029186 A1* | 2/2011 | Ishikawa | ................ | G07C 5/0808 701/29.5 |
| 2011/0118932 A1* | 5/2011 | Singh | ................ | G05B 23/0232 701/31.4 |
| 2011/0145026 A1* | 6/2011 | Singh | ................ | G06Q 10/063 705/7.11 |
| 2011/0172874 A1* | 7/2011 | Patnaik | ................ | G06F 11/008 701/31.4 |
| 2011/0208742 A1* | 8/2011 | Chakrabarty | ................ | G06Q 10/06 707/740 |
| 2011/0238258 A1* | 9/2011 | Singh | ................ | G07C 5/0808 701/31.4 |
| 2012/0116630 A1* | 5/2012 | Howell | ................ | G06Q 10/10 701/29.4 |
| 2012/0296567 A1* | 11/2012 | Breed | ................ | G01C 21/26 701/468 |
| 2014/0025249 A1* | 1/2014 | Giles | ................ | B60W 20/50 701/29.2 |
| 2015/0046389 A1* | 2/2015 | Dhayapule | ................ | G06F 11/079 707/602 |
| 2017/0024943 A1* | 1/2017 | Wodecki | ................ | G07C 5/006 |
| 2017/0109646 A1* | 4/2017 | David | ................ | H01L 22/12 |
| 2017/0371305 A1* | 12/2017 | Tiwari | ................ | G05B 9/02 |
| 2019/0172278 A1* | 6/2019 | Castro Duran | ................ | G07C 5/12 |
| 2020/0126167 A1* | 4/2020 | Meerkov | ................ | G06Q 10/06316 |
| 2020/0167640 A1* | 5/2020 | Sundareswara | ................ | G06N 20/10 |
| 2020/0285997 A1* | 9/2020 | Bhattacharyya | ................ | G06N 20/00 |
| 2020/0310900 A1* | 10/2020 | Hipp | ................ | G06Q 10/0631 |
| 2020/0410374 A1* | 12/2020 | White | ................ | A62B 27/00 |
| 2021/0118242 A1* | 4/2021 | Gautam | ................ | B64D 13/06 |

* cited by examiner

Labor Code Classifier (42)

| 44 → ↓ | LC0= LC1-LC4 | LC5 | LC6 |
|---|---|---|---|
| LC0= LC1-LC4 | 1 | 0 | 0 |
| LC5 | 0.03 | 0.51 | 0.46 |
| LC6 | 0.01 | 0 | 0.99 |

Ground Truth

VEHICLE FAULT ROOT CAUSE DIAGNOSIS

INTRODUCTION

The present disclosure relates to root cause diagnosis of vehicle system faults.

Vehicles may experience various concerns, issues, or faults during their operation. Serious vehicle faults may cause the vehicle to become immobile, but, generally, the majority of faults in a vehicle lead to user dissatisfaction. A vehicle breakdown is typically either an electrical or a mechanical failure in which the underlying fault prevents the vehicle from being operated at all, or makes the vehicle difficult to operate. Depending on the nature and severity of the fault, a vehicle may or may not need to be towed to a repair shop, such as an authorized dealership.

A breakdown occurs when a vehicle stalls on the road. A vehicle may stall for a variety of faults ranging from a dead battery, fuel pump, poor quality fuel, faulty electrical wiring or sensors, fuel pressure problems, overlooked leaks, etc. A complete vehicle breakdown takes place when the vehicle becomes totally immobile and may not be driven even a short distance to reach a repair shop, thereby necessitating a tow. A complete breakdown may occur for a variety of reasons, including engine or transmission failure, or a dead starter or battery, though a dead battery may be able to be temporarily resolved with a jump start.

In a partial breakdown, the vehicle may still be operable, but its operation may become more limited or its continued operation may contribute to further vehicle damage. Often, when a partial breakdown occurs, it may be possible to drive the vehicle to a repair shop, thereby avoiding a tow. Some common causes of a partial breakdown include overheating, brake failure, and intermittent stalling. Some faults do not lead to vehicle breakdowns, but may, for example, impede full use of the vehicle's infotainment or climate control systems. Some of the above vehicle faults may be intermittent—they set a diagnostic trouble code, but then recover by themselves. Such faults may be difficult to diagnose or duplicate, and may cause vehicle componentry to be replaced without resolving the issue. Generally, intermittent vehicle faults tend to increase warranty costs and may also negatively impact customer satisfaction.

SUMMARY

A method of root cause diagnosis of fault data from a vehicle includes identifying a first vehicle fault and selecting from field repair data, via an executable computer algorithm, a vehicle feature corresponding to the identified first vehicle fault. The method also includes identifying from the field repair data, via the executable computer algorithm, an effective repair of the identified first vehicle fault. The method additionally includes training and testing via a machine learning algorithm, a labor code classifier using the identified effective repair of the first vehicle fault and the selected vehicle feature corresponding to the identified first vehicle fault. The method also includes identifying and classifying, via the executable computer algorithm, using the trained labor code classifier, indistinguishable, e.g., ambiguous by test result, labor codes. Furthermore, the method includes communicating the identified and classified indistinguishable labor codes for diagnosing a root cause of real time first vehicle fault data. The method may be specifically used to diagnose intermittent system faults.

The act of selecting the vehicle feature from field repair data may include selecting the field repair data from a vehicle fleet.

The act of selecting a vehicle feature corresponding to the identified first vehicle fault includes selecting the vehicle feature from a predefined set of vehicle features.

The act of selecting the vehicle feature from a predefined set of vehicle features may include identifying a second vehicle fault that is unrelated to the first vehicle fault, i.e., has a known different root cause. The act of selecting the vehicle feature from a predefined set of vehicle features may also include comparing probability distributions of the vehicle features from the predefined set of vehicle features for the first vehicle fault and for the second vehicle fault. Furthermore, the act of selecting the vehicle feature from a predefined set of vehicle features may include removing from the predefined set of vehicle features a vehicle feature having statistically or substantially equivalent probability distributions for the first vehicle fault and for the second vehicle fault.

The method may additionally include removing from the predefined set of vehicle features a vehicle feature having a sufficient correlation to the removed vehicle feature.

The sufficient correlation may be determined via Pearson correlation coefficient distribution analysis.

The identifying an effective repair of the first vehicle fault may include identifying passage of at least one of a predetermined duration of time and a predetermined distance traveled by the vehicle after repair without recurrence of the first vehicle fault.

The identifying and classifying indistinguishable labor codes may include forming a labor code versus ground truth class confidence matrix and forming a labor code versus ground truth class identity matrix therefrom.

The identifying and classifying indistinguishable labor codes further may include performing hierarchical labor code classification via merging classes in the formed labor code versus ground truth class identity matrix.

The identifying and classifying indistinguishable labor codes may further include refining labor code classification via Bayesian inference analysis.

Also disclosed is a computer-readable medium storing an executable algorithm configured to, upon execution by a processor, perform the above root cause diagnosis of vehicle fault data.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
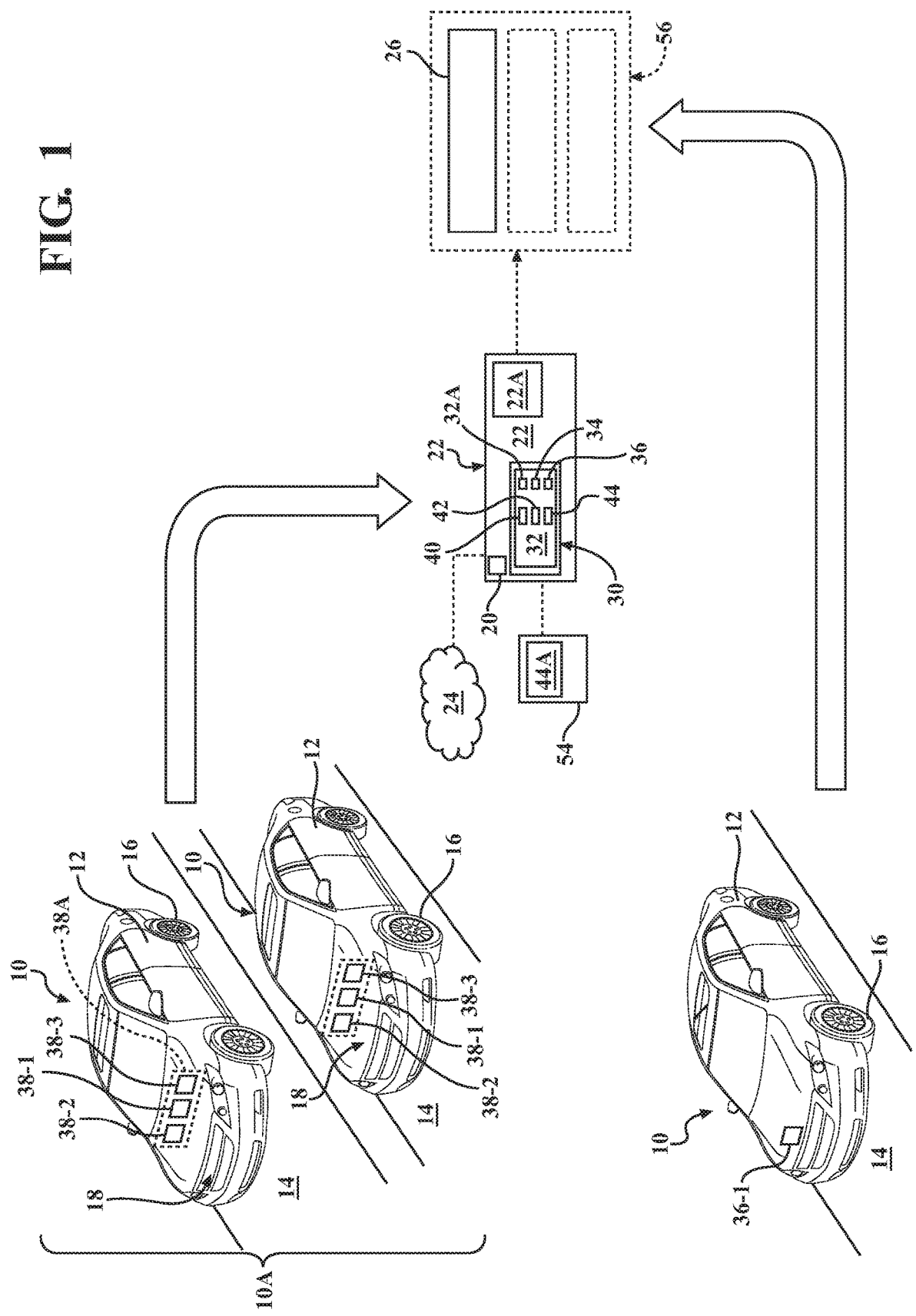
FIG. 1 is a schematic perspective view of a fleet of motor vehicles in electronic communication being monitored for identifying and analyzing vehicle fault and repair data via a computer algorithm to facilitate root cause determination of the subject faults, according to the present disclosure.

Referring to the drawings, wherein like reference numbers refer to like components, FIG. 1 shows a schematic view of a motor vehicle 10. As shown, the motor vehicle 10 has a vehicle body 12. The vehicle 10 may be used to traverse a road surface 14 via a plurality of road wheels 16 powered by the vehicle's powertrain. Although four wheels 16 are shown in FIG. 1, a vehicle with fewer or greater number of wheels, or having other means, such as tracks (not shown), of traversing the road surface or other portions of the terrain 14 is also envisioned. The vehicle 10 may include a number of mechanical, electrical, and other systems 18, such as the vehicle powertrain; heating, ventilation, and air conditioning (HVAC) system; and infotainment system, all arranged on and/or mounted to the vehicle body 12.

Such systems 18 may experience various concerns, issues, or faults during operation of the vehicle 10. Some system 18 faults may cause the vehicle 10 to become immobile, while other system 18 faults are less catastrophic, but may still result in user dissatisfaction with the vehicle. Vehicle system 18 faults may be intermittent. Such intermittent faults may cause temporary loss of system 18 functionality, they may also set a diagnostic trouble code, but then recover by themselves. A vehicle system 18 fault is typically addressed by a qualified service technician at a vehicle service center or a repair shop. Depending on whether the vehicle 10 is covered by a manufacturer's or a third party warranty, the cost of the repair may be covered by either the warranty or the vehicle's owner. However, intermittent system 18 faults are difficult to diagnose or duplicate, which may require the owner's repeat visits to the service center, and increase warranty costs.

A fleet 10A of similar vehicles, i.e., having the system 18 in common, such as the vehicle 10, and repairs of system 18 faults among the fleet 10A may be monitored using a database 20 supported by a programmable central computer 22 or an information technology (IT) cloud platform 24 (shown in FIG. 1). Generally, an IT cloud platform is a provider-managed suite of hardware and software. An IT paradigm enables universal access to shared pools of configurable system resources and higher-level services that may be rapidly provisioned with minimal management effort, often over the Internet. Furthermore, cloud computing relies on sharing of resources to achieve coherence and economies of scale, similar to a public utility. The IT cloud platform 24 may also be employed in communication with the central computer 22 for coordinating and managing operation of such a fleet 10A of vehicles 10.

The central computer 22 is arranged remotely from the fleet 10A. The central computer 22 includes a memory that is tangible and non-transitory. The memory may be a recordable medium that participates in providing computer-readable data or process instructions. Such a medium may take many forms, including but not limited to non-volatile media and volatile media. Non-volatile media used by the central computer 22 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to an electronic processor 22A of the central computer 22. Memory of the central computer 22 may also include a flexible disk, hard disk, magnetic tape, other magnetic medium, a CD-ROM, DVD, other optical medium, etc. The central computer 22 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the central computer 22 or accessible thereby may be stored in the memory and automatically executed to provide the required functionality.

The database 20 may be accessible via a single computer 26 or via a plurality of similar linked computers, as shown in FIG. 1. Either the central computer 22 or the IT cloud platform 24 is configured to employ or access a computer-readable medium 30 storing an executable algorithm 32 configured, upon execution by a processor, such as the electronic processor 22A, to perform root cause diagnosis 34 of fault data from the vehicle 10 and the fleet 10A. The root cause diagnosis 34 may be specifically used to diagnose intermittent system 18 faults. Accordingly, the algorithm 32 may be programmed into the electronic processor 22A of the central computer 22 (not shown) or embedded into a discrete accessible computer-readable medium (CRM), as shown in FIG. 1. The algorithm 32 is used to analyze real time first vehicle fault 36 data. The algorithm 32 includes identifying a first vehicle fault 36-1 (shown in FIG. 2). The algorithm 32 also includes selecting from field repair data, for example from data of repairs performed on the vehicles 10 in the fleet 10A and stored in the database 20, a vehicle feature 38-1 corresponding to the identified first vehicle fault 36-1. The selected vehicle feature 38-1 corresponds to or is part of a particular system 18.

Figure 2:
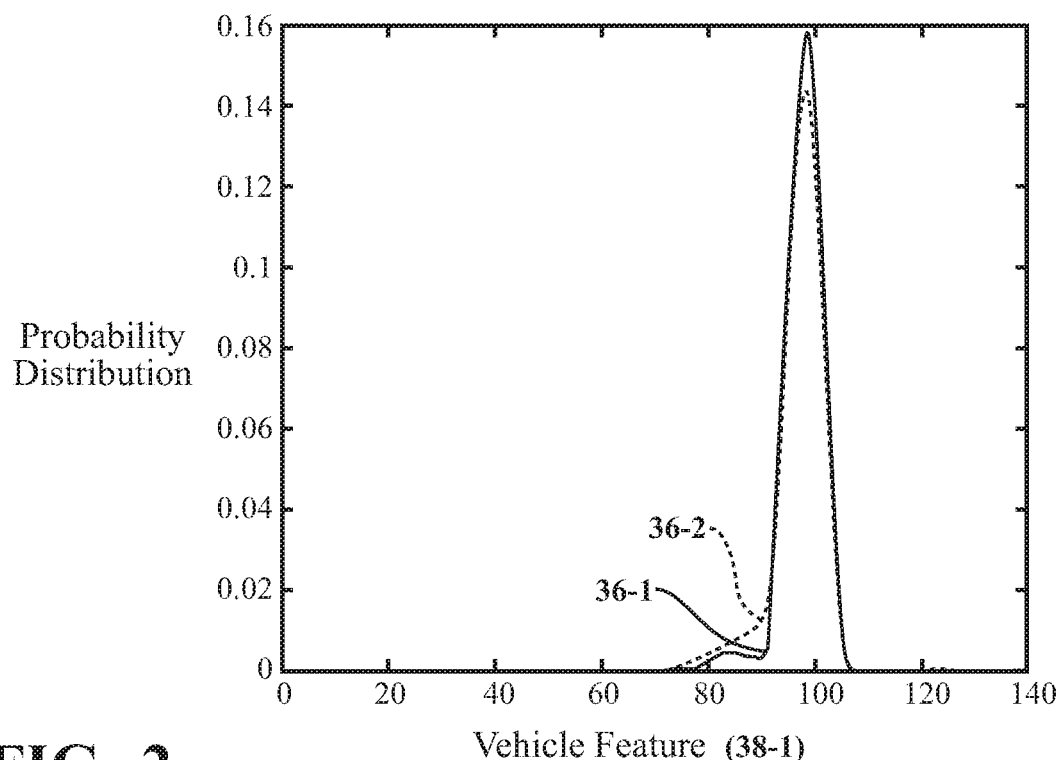
FIG. 2 is a graphical representation of an embodiment of methodology executed by the algorithm indicated in FIG. 1 to select a vehicle feature from a predefined set of vehicle features, which includes identifying and isolating unrelated vehicle faults, according to the present disclosure.

In one embodiment, selecting the vehicle feature 38-1 corresponding to the identified first vehicle fault 36-1 may include selecting the vehicle feature from a predefined set 38A of vehicle features (shown in FIG. 1). Selecting the vehicle feature 38-1 from the predefined set 38A of vehicle features via the algorithm 32 may include identifying a second vehicle fault 36-2 that is unrelated to the first vehicle fault 36-1, i.e., has a known different root cause, as shown in FIG. 2 depicting first and second vehicle faults plotted versus probability distribution. Also, in such an embodiment, selecting the vehicle feature 38-1 from the predefined set 38A would also include comparing probability distributions of the vehicle features from the predefined set 38A of vehicle features for the first vehicle fault 36-1 and for the second vehicle fault 36-2.

Furthermore, in the above embodiment, the algorithm 32 may include removing from the predefined set 38A of vehicle features, i.e., removing from consideration or isolating, a vehicle feature 38-2 having statistically or substantially equivalent probability distributions for the first vehicle fault 36-1 and for the second vehicle fault 36-2. A comparison of the probability distributions of the vehicle features for the first and second vehicle faults 36-1, 36-2 may be performed via a Jensen-Shannon Divergence (JSD) analysis. The Jensen-Shannon Divergence analysis for the first and second vehicle faults 36-1, 36-2 may be expressed as follows:

$$JSD(P1, P2) = \frac{1}{2}\sum\left(P1(i)\log\frac{P1(i)}{M(i)} + P2(i)\log\frac{P2(i)}{M(i)}\right)$$

wherein $M=\frac{1}{2}(P1+P2)$, and wherein P1 and P2 are probability distributions of the vehicle feature 38-2 for the respective first and second vehicle faults 36-1, 36-2 referenced in the present disclosure.

Figure 3:
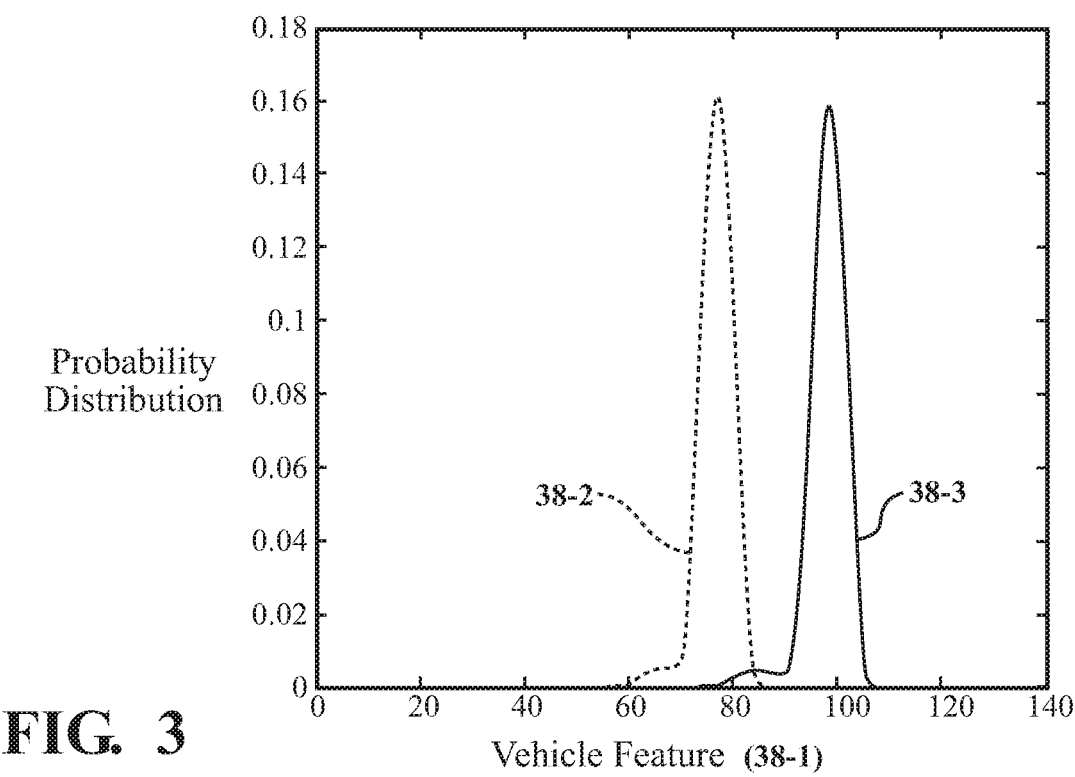
FIG. 3 is a graphical representation of an embodiment of methodology executed by the algorithm to remove from the predefined set of vehicle features a vehicle feature having a sufficient correlation to the removed vehicle feature, according to the present disclosure.

As shown in FIG. 3, the algorithm 32 may additionally include removing from the predefined set 38A of vehicle features a vehicle feature 38-3 having a sufficient correlation to the removed vehicle feature 38-2. Specifically, the sufficient correlation may be determined via Pearson correlation coefficient (PCC) distribution analysis. Generally, in statistics, the Pearson correlation coefficient, also referred to as Pearson's r, the Pearson product-moment correlation coefficient (PPMCC) or the bivariate correlation, is a measure of the linear correlation between two variables X and Y. Owing to the Cauchy-Schwarz inequality it has a value between +1 and −1, where 1 is total positive linear correlation, 0 is no linear correlation, and −1 is total negative linear correlation. The particular correlation may, for example, be considered "sufficient" above a specific minimum value, such as greater than 0.7. With reference to FIG. 3, Pearson correlation coefficient analysis for the vehicle features 38-2, 38-3 may be expressed as follows:

$$PCC(P1, P2) = \frac{n\sum P1(i)P2(i) - \sum P1(i)\sum P2(i)}{\sqrt{n\sum P1^2(i) - (\sum P1(i))^2}\sqrt{n\sum P2^2(i) - (\sum P2(i))^2}}$$

where n is the sample size, and wherein P1 and P2 are probability distributions for the respective vehicle features 38-2, 38-3 referenced in the present disclosure.

Figure 4:
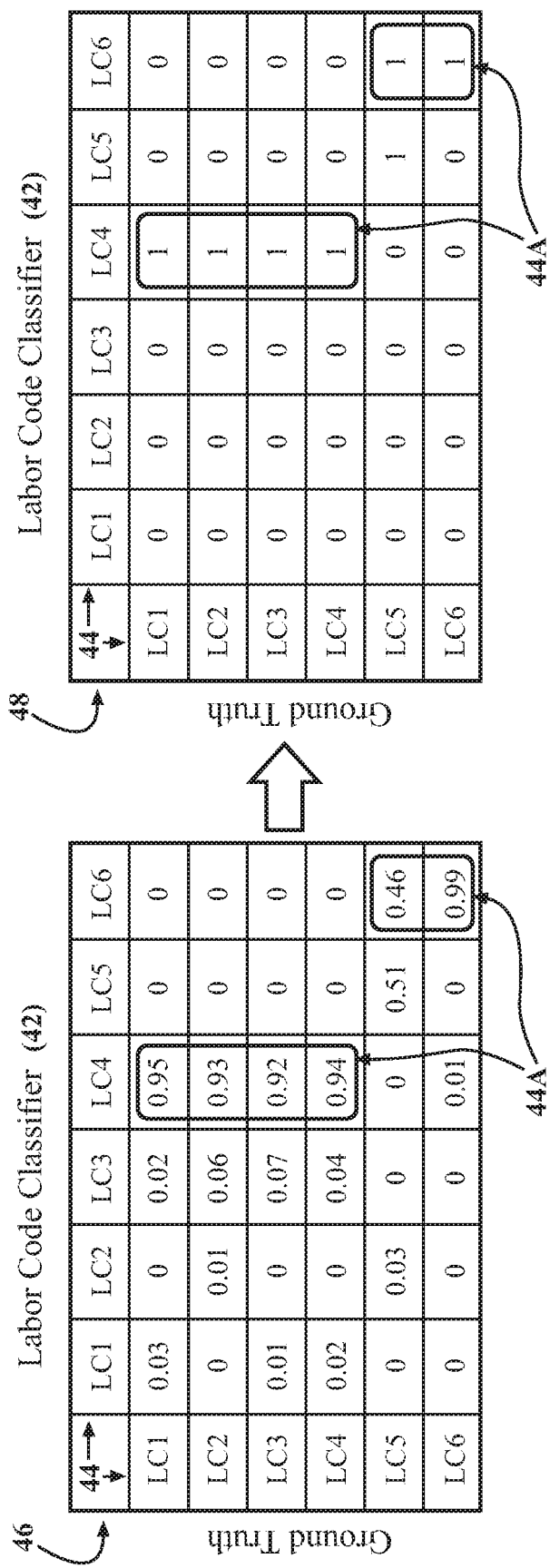
FIG. 4 is a graphical representation of an embodiment of methodology executed by the algorithm to identify and classify indistinguishable labor codes by forming labor code versus ground truth matrices, according to the present disclosure.

The algorithm 32 also includes identifying from the field repair data, for example via the electronic processor 22A, such as part of the central computer 22, an effective repair 40 (shown in FIG. 1) of the first vehicle fault 36-1. Identifying an effective repair 40 of the first vehicle fault 36-1 may include identifying passage of at least one of a predetermined duration of time T and a predetermined distance D traveled by the vehicle 10 after the repair 40 without recurrence of the first vehicle fault 36-1. The algorithm 32 additionally includes training and testing, and thereby establishing a labor code (LC) classifier 42, as shown in FIG. 4. The algorithm 32 employs an embedded artificial intelligence (AI) or machine learning algorithm 32A, such as a trainable artificial neural network, which may be employed by the central computer 22, and specifically embedded in or paired with the executable computer algorithm 32. The machine learning algorithm 32A is specifically configured to assess and learn from the incoming field repair data to establish the labor code classifier 42. Specifically, the training and testing of the labor code classifier 42 is achieved by using the identified effective repair 40 of the first vehicle fault 36-1 and the selected vehicle feature 38-1 corresponding to the identified first vehicle fault 36-1. Labor codes 44 are generally used by the database 20 to identify various repairs of vehicle systems, such as the system 18.

Figure 5:
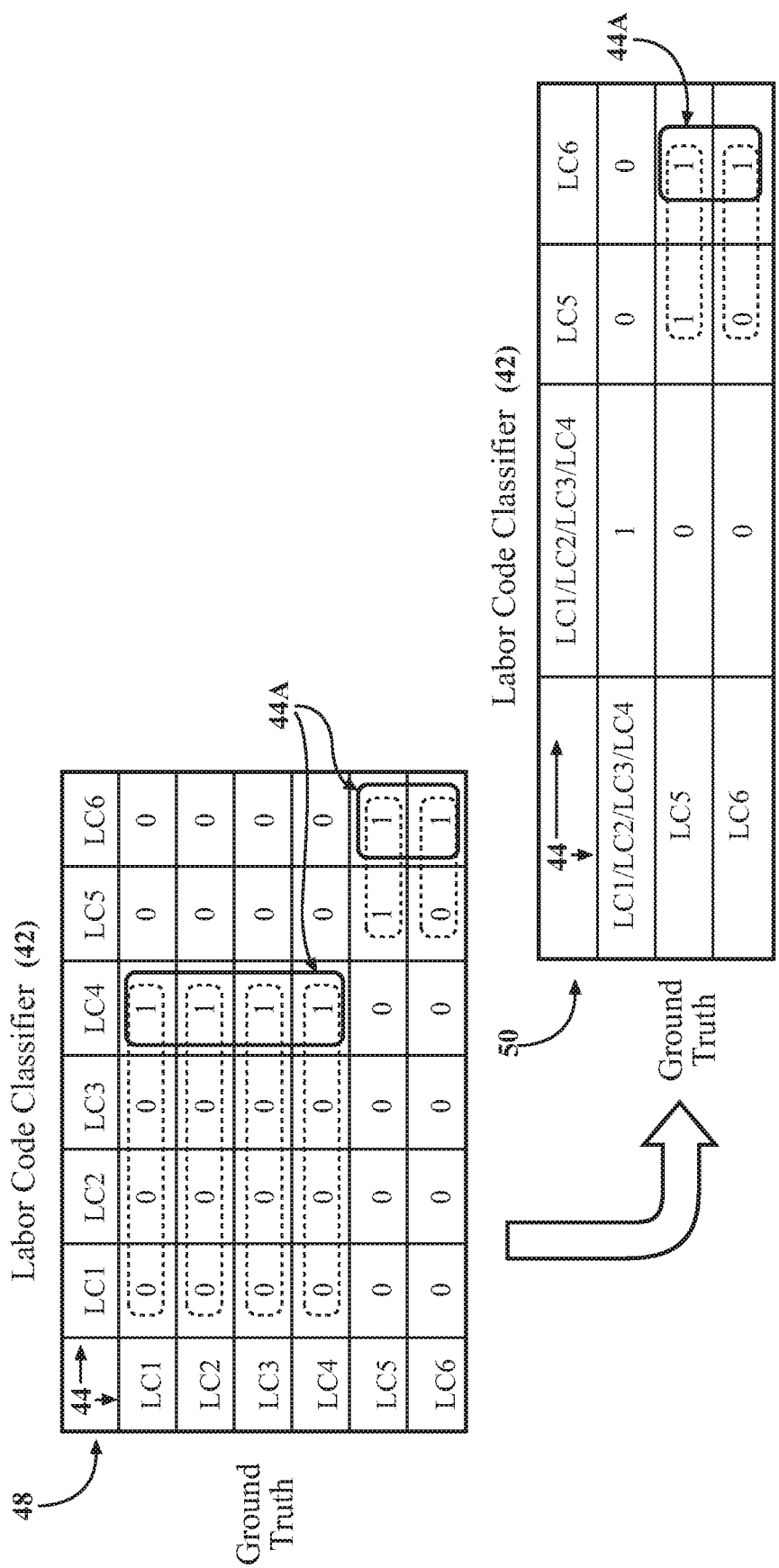
FIG. 5 is a graphical representation of an embodiment of methodology executed by the algorithm to identify and classify indistinguishable labor codes by further performing hierarchical labor code classification to form a labor code recommendation matrix, according to the present disclosure.

The algorithm 32 also includes identifying and classifying (and thereby isolating), using the trained labor code classifier 42, indistinguishable labor codes 44A, i.e., which are ambiguous or indistinct from other labor codes 44 based on the results of testing performed via the machine learning algorithm 32A. As shown in FIG. 4, identifying and classifying indistinguishable labor codes 44A may include forming a labor code versus ground truth class confidence matrix 46 and forming a labor code versus ground truth class identity matrix 48 therefrom. As shown in FIG. 5, identifying and classifying indistinguishable labor codes 44A may further include performing hierarchical labor code classification via merging classes in the formed labor code versus ground truth class identity matrix 48 to form a labor code recommendation matrix 50. Specifically, in FIGS. 4 and 5, labor codes $LC_5$ and $LC_6$ represent indistinguishable labor codes 44A.

Figures 6, 7:
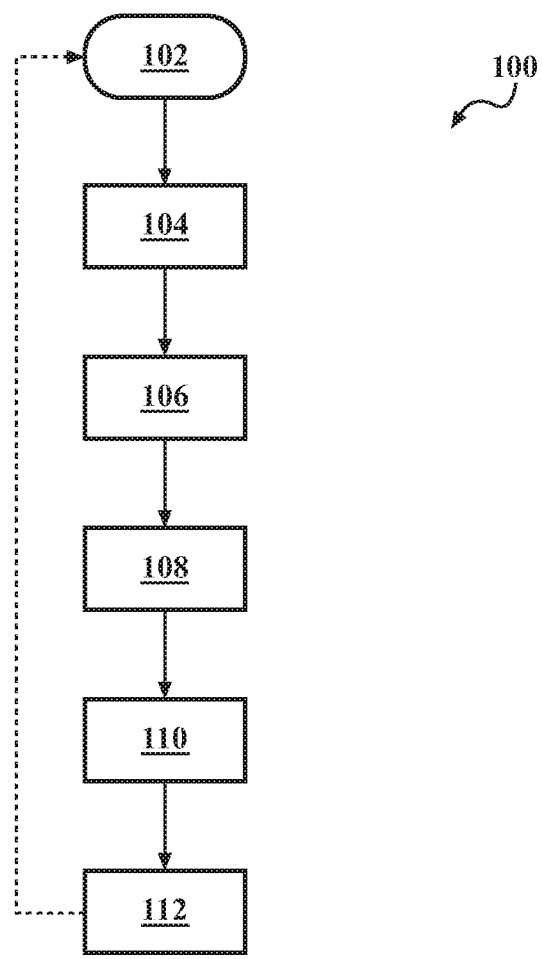
FIG. 6 is a graphical representation of an embodiment of methodology executed by the algorithm to identify and classify indistinguishable labor codes by further refining labor code classification via Bayesian inference analysis, according to the present disclosure.
FIG. 7 is a flow diagram of a method of root cause diagnosis of fault data from the vehicle and the vehicle fleet shown in FIGS. 1-6, according to the present disclosure.

As shown in FIG. 6, identifying and classifying indistinguishable labor codes 44A may further include refining labor code classification via forming a class confidence matrix 52 and applying Bayesian inference analysis. Specifically, Bayesian inference analysis may be applied for further refinement when the labor code classifier reports $LC_5$, and the outcome as accurate, but when $LC_6$ is reported, there is a possibility that the pattern belongs to either $LC_5$ or $LC_6$. Similar to FIGS. 4 and 5, in FIG. 6 the labor codes $LC_5$ and $LC_6$ represent indistinguishable labor codes 44A. In general, Bayesian inference is a method of statistical inference in which Bayes' theorem is used to update the probability for a hypothesis as more evidence or information becomes available. Bayesian inference is an important technique in statistics, and especially in mathematical statistics. Bayesian inference derives the posterior probability as a consequence of two antecedents: a prior probability and a "likelihood function" derived from a statistical model for the observed data. Bayesian inference computes the posterior probability according to Bayes' theorem. With continued reference to FIG. 6, Bayesian inference analysis for the indistinguishable labor codes 44A may be expressed as follows:

P(Report=$LC_6$|Truth=$LC_5$)=0.46

P(Truth=$LC_i$), i=0, 5, 6 is the known probability distribution assuming P(Truth)=$L_i$)=⅓, i=0, 5, 6)

$$P(T = LC_5 | R = LC_6) = \frac{P(R = LC_6 | T = LC_5) \cdot P(T = LC_5)}{P(R = LC_6)} =$$

$$\frac{P(R = LC_6 | T = LC_5) \cdot P(T = LC_5)}{\sum_{i=0,5,6} P(R = LC_6 | T = LC_i) \cdot P(T = LC_i)} =$$

$$\frac{0.46 * 1/3}{0 * 1/3 + 0.46 * 1/3 + 0.99 * 1/3} = 0.32$$

wherein $LC_5$ and $LC_6$ are indistinguishable labor codes 44A shown in FIGS. 4-6.

Following identifying and classifying the indistinguishable labor codes 44A the algorithm 32 further includes storing in the database 20 or on a server 54 (shown in FIG.

1) connected to the central computer 22 the identified and classified indistinguishable labor codes 44A. The database 20 and/or the server 54 may be accessed by remote computer (s) 26. The computer 26 may be part of a computer network 56 (shown in FIG. 1) in electronic communication with the database 20, located in a service center, and accessible by a technician. As a result, the identified and classified indistinguishable labor codes 44A may be communicated on demand to a service technician for performing a diagnosis and subsequent repair of a root cause of real time first vehicle fault 36-1 data.

FIG. 7 depicts a method 100 of root cause diagnosis 34 of fault data from the vehicle 10 and the fleet 10A, as described above with respect to FIGS. 1-6. As described above, the method 100 is intended to be embodied in the algorithm 32 and employ machine learning to perform the root cause diagnosis 34. As discussed above, the root cause diagnosis 34 may be specifically used to diagnose and repair intermittent system 18 faults.

The method 100 initiates in frame 102 with identifying the first vehicle fault 36-1. Following frame 102, the method proceeds to frame 104. In frame 104, the method includes selecting from the field, such as the vehicle fleet 10A, repair data, via the electronic processor 22A, for example, of the central controller 22, the vehicle feature 38-1 corresponding to the identified first vehicle fault 36-1. As described above, selecting the vehicle feature 38-1 from field repair data may include selecting the field repair data from or corresponding to the vehicle fleet 10A.

Additionally, selecting the vehicle feature 38-1 corresponding to the identified first vehicle fault 36-1 may include selecting the vehicle feature from a predefined set 38A of vehicle features. Selecting the vehicle feature 38-1 from the predefined set 38A of vehicle features via the algorithm 32 may include identifying the second vehicle fault 36-2 that is unrelated to the first vehicle fault 36-1. Also, selecting the vehicle feature 38-1 from the predefined set 38A would also include comparing probability distributions of the vehicle features from the predefined set 38A of vehicle features for the first vehicle fault 36-1 and for the second vehicle fault 36-2.

Furthermore, the algorithm 32 may include removing from the predefined set 38A of vehicle features the vehicle feature 38-2 having substantially or statistically equivalent probability distributions for the first vehicle fault 36-1 and for the second vehicle fault 36-2. As described above, such a comparison of the probability distributions of the vehicle features for the first and second vehicle faults 36-1, 36-1 may be performed via a Jensen-Shannon Divergence analysis. Additionally, removing from the predefined set 38A of vehicle features a vehicle feature 38-3 having a sufficient, correlation to the removed vehicle feature 38-2 may be determined via the Pearson correlation coefficient distribution analysis.

In frame 104, the method may further include removing from the predefined set 38A of vehicle features the vehicle feature having a sufficient or sufficiently high correlation to the removed vehicle feature 38-2. As described above, the sufficient correlation may be determined via Pearson correlation coefficient distribution analysis. After frame 104, the method advances to frame 106. In frame 106, the method includes identifying from the field repair data, such as via the electronic processor 22A, effective repair 40 of the identified first vehicle fault 36-1. Identifying effective repair 40 of the first vehicle fault 36-1 may include identifying passage of at least one of a predetermined duration of time T and a predetermined distance D traveled by the vehicle 10 after the repair 40 without recurrence of the first vehicle fault 36-1.

Following frame 106, the method proceeds to frame 108. In frame 108 the method includes establishing, such as by training and testing via the machine learning algorithm 32A, the labor code classifier 42 using the identified effective repair 40 of the first vehicle fault 36-1 and the selected vehicle feature 38-1 corresponding to the identified first vehicle fault. After frame 108, the method advances to frame 110. As described above with respect to FIGS. 1-6, in frame 110 the method includes identifying and classifying, such as via the electronic processor 22A, using the trained labor code classifier 42 to thereby isolate indistinguishable labor codes 44A.

Identifying and classifying indistinguishable labor codes 44A in frame 110 may include forming a labor code versus ground truth class confidence matrix 46 and forming a labor code versus ground truth class identity matrix 48 therefrom. Identifying and classifying indistinguishable labor codes 44A may also include performing hierarchical labor code classification via merging classes in the formed labor code versus ground truth class identity matrix 48. Furthermore, identifying and classifying indistinguishable labor codes 44A may include refining labor code classification via Bayesian inference analysis. After frame 110, the method advances to frame 112. In frame 112 the method includes communicating the identified and classified indistinguishable labor codes 44A for diagnosing a root cause of real time first vehicle fault 36-1 data. Following frame 112, the method may return to frame 102 for identifying an additional fault in the vehicle 10, i.e., different from the previously identified first vehicle fault 36-1, for similar analysis.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of root cause diagnosis of fault data from a vehicle, the method comprising:
    identifying a first vehicle fault;
    selecting from field repair data a vehicle feature corresponding to the identified first vehicle fault via an executable computer algorithm;
    identifying from the field repair data an effective repair that remedied the identified first vehicle fault via the executable computer algorithm;
    training and testing, via a machine learning algorithm, a labor code classifier using, as input to the machine learning algorithm, the identified effective repair of the first vehicle fault and the selected vehicle feature corresponding to the identified first vehicle fault;

identifying and classifying indistinguishable labor codes, via the executable computer algorithm using the trained labor code classifier; and communicating the identified and classified indistinguishable labor codes for diagnosing a root cause of real time first vehicle fault data.

2. The method according to claim 1, further comprising selecting the field repair data from a vehicle fleet.

3. The method according to claim 1, wherein the selecting a vehicle feature corresponding to the identified first vehicle fault includes selecting the vehicle feature from a predefined set of vehicle features.

4. The method according to claim 3, wherein the selecting the vehicle feature from a predefined set of vehicle features includes:

identifying a second vehicle fault that is unrelated to the first vehicle fault;

comparing probability distributions of the vehicle features from the predefined set of vehicle features for the first vehicle fault and for the second vehicle fault; and removing from the predefined set of vehicle features a vehicle feature having statistically equivalent probability distributions for the first vehicle fault and for the second vehicle fault.

5. The method according to claim 4, further comprising removing from the predefined set of vehicle features a vehicle feature having a sufficient correlation to the removed vehicle feature.

6. The method according to claim 5, wherein the sufficient correlation is determined via Pearson correlation coefficient distribution analysis.

7. The method according to claim 1, wherein the identifying an effective repair of the first vehicle fault includes identifying passage of at least one of a predetermined duration of time and a predetermined distance traveled by the vehicle after repair without recurrence of the first vehicle fault.

8. The method according to claim 1, wherein the identifying and classifying indistinguishable labor codes includes forming a labor code versus ground truth class confidence matrix and forming a labor code versus ground truth class identity matrix therefrom.

9. The method according to claim 8, wherein the identifying and classifying indistinguishable labor codes further includes performing hierarchical labor code classification via merging classes in the formed labor code versus ground truth class identity matrix.

10. The method according to claim 9, wherein the identifying and classifying indistinguishable labor codes further includes refining labor code classification via Bayesian inference analysis.

11. A non-transitory computer-readable medium storing an executable algorithm configured, upon execution by a processor, to perform root cause diagnosis of fault data from a vehicle, the executable algorithm comprising:

identifying a first vehicle fault;

selecting a vehicle feature corresponding to the identified first vehicle fault from field repair data;

identifying an effective repair that remedied the identified first vehicle fault from the field repair data;

training and testing, via machine learning, a labor code classifier using, as input to the machine learning algorithm, the identified effective repair of the first vehicle fault and the selected vehicle feature corresponding to the identified first vehicle fault;

identifying and classifying, indistinguishable labor codes using the trained labor code classifier; and communicating the identified and classified indistinguishable labor codes for a diagnosis of a root cause of real time first vehicle fault data.

12. The computer-readable medium according to claim 11, further comprising selecting the field repair data from a vehicle fleet.

13. The computer-readable medium according to claim 11, wherein the selecting a vehicle feature corresponding to the identified first vehicle fault includes selecting the vehicle feature from a predefined set of vehicle features.

14. The computer-readable medium according to claim 13, wherein the selecting the vehicle feature from a predefined set of vehicle features includes:

identifying a second vehicle fault that is unrelated to the first vehicle fault;

comparing probability distributions of the vehicle features from the predefined set of vehicle features for the first vehicle fault and for the second vehicle fault; and removing from the predefined set of vehicle features a vehicle feature having statistically equivalent probability distributions for the first vehicle fault and for the second vehicle fault.

15. The computer-readable medium according to claim 14, wherein the executable computer algorithm additionally includes removing from the predefined set of vehicle features a vehicle feature having a sufficient correlation to the removed vehicle feature.

16. The computer-readable medium according to claim 15, wherein the sufficient correlation is determined via Pearson correlation coefficient distribution analysis.

17. The computer-readable medium according to claim 11, wherein the identifying an effective repair of the first vehicle fault includes identifying passage of at least one of a predetermined duration of time and a predetermined distance traveled by the vehicle after repair without recurrence of the first vehicle fault.

18. The computer-readable medium according to claim 11, wherein the identifying and classifying indistinguishable labor codes includes forming a labor code versus ground truth class confidence matrix and forming a labor code versus ground truth class identity matrix therefrom.

19. The computer-readable medium according to claim 18, wherein the identifying and classifying indistinguishable labor codes further includes performing hierarchical labor code classification via merging classes in the formed labor code versus ground truth class identity matrix.

20. The computer-readable medium according to claim 19, wherein the identifying and classifying indistinguishable labor codes further includes refining labor code classification via Bayesian inference analysis.

* * * * *